US012617931B2

(12) United States Patent
Nukui et al.

(10) Patent No.: US 12,617,931 B2
(45) Date of Patent: *May 5, 2026

(54) GLASS FIBER-REINFORCED RESIN MOLDED ARTICLE

(71) Applicant: NITTO BOSEKI CO., LTD., Fukushima (JP)

(72) Inventors: Yosuke Nukui, Fukushima (JP); Mao Takaizumi, Fukushima (JP); Shunsuke Kusaba, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 731 days.

This patent is subject to a terminal disclaimer.

(21) Appl. No.: 17/424,260

(22) PCT Filed: Sep. 4, 2019

(86) PCT No.: PCT/JP2019/034865

§ 371 (c)(1),
(2) Date: Jul. 20, 2021

(87) PCT Pub. No.: WO2019/216443

PCT Pub. Date: Nov. 14, 2019

(65) Prior Publication Data

US 2022/0112358 A1 Apr. 14, 2022

(30) Foreign Application Priority Data

Feb. 27, 2019 (JP) ................................. 2019-033635

(51) Int. Cl.
*C08K 7/14* (2006.01)
(52) U.S. Cl.
CPC ...................................... *C08K 7/14* (2013.01)
(58) Field of Classification Search
None
See application file for complete search history.

(56) References Cited

U.S. PATENT DOCUMENTS

2011/0105655 A1* 5/2011 Harder ................... C08K 5/529
524/101
2011/0240930 A1 10/2011 Stoeppelmann et al.

FOREIGN PATENT DOCUMENTS

| | | | | | |
|---|---|---|---|---|---|
| CN | 1990543 | B | * | 8/2011 | ............... C08K 3/00 |
| CN | 102675863 | A | | 9/2012 | |
| JP | 2008-013702 | A | | 1/2008 | |
| JP | 2008-095066 | A | | 4/2008 | |
| JP | 2012-025844 | A | | 2/2012 | |
| JP | 2013053316 | A | * | 3/2013 | ............ B29C 66/71 |
| JP | 2015-124260 | A | | 7/2015 | |
| JP | 2017-052925 | A | | 3/2017 | |
| WO | 2014/171363 | A1 | | 7/2015 | |
| WO | 2017/171101 | A1 | | 10/2017 | |
| WO | 2018/159861 | A2 | | 9/2018 | |

OTHER PUBLICATIONS

CN1990543B English translation (Year: 2011).*
JP2013053316A (Year: 2013).*
Office Action dated May 23, 2023 issued in the corresponding Chinese Patent Application No. 201980092889.1.
Extended European search report dated Aug. 12, 2022 issued in the corresponding European Patent Application No. 19799395.9.

* cited by examiner

*Primary Examiner* — Catherine S Branch
*Assistant Examiner* — Huihong Qiao
(74) *Attorney, Agent, or Firm* — Carrier, Shende & Associates P.C.; Joseph P. Carrier; Jeffrey T. Gedeon

(57) ABSTRACT

Provided is a glass fiber-reinforced resin molded article with high mechanical strength and in which occurrence of undispersion of glass fiber is suppressed. In the glass fiber-reinforced resin molded article, glass fiber includes a flat cross-sectional shape having a minor axis D1 in the range of 3.0 μm or more and 10.5 μm or less and a major axis D2 in the range of 11.0 μm or more and 29.0 μm or less, the number average fiber length L (μm) of the glass fiber included in the glass fiber-reinforced resin molded article is in the range of 195 μm or more and less than 400 μm, the glass fiber content C (wt %) in the glass fiber-reinforced resin molded article is in the range of more than 50.0 wt % and 80.0 wt % or less, and the D1, D2, L, and C satisfy the following formula (1):

$$1200.0 \leq C \times L^2/(D1 \times D2^2) \leq 2550.0 \qquad (1).$$

10 Claims, No Drawings

GLASS FIBER-REINFORCED RESIN MOLDED ARTICLE

TECHNICAL FIELD

The present invention relates to a glass fiber-reinforced resin molded article.

BACKGROUND ART

Conventionally, glass fiber has been widely used in various applications to improve the performance of resin molded articles. Examples of the performance to be improved by glass fiber herein include mechanical strength such as tensile strength and bending strength of glass fiber-reinforced resin molded articles. So far, influences given by characteristics of glass fiber, such as the fiber diameter of glass fiber (glass fiber is usually composed of a plurality of glass filaments bundled, and the average diameter of the glass filaments is referred to as the fiber diameter of the glass fiber), the length of the glass fiber in a glass fiber-reinforced resin molded article, the glass content in the glass fiber-reinforced resin molded article, and the cross-sectional shape of glass filaments, on the mechanical strength of the glass fiber-reinforced resin molded article have been investigated (e.g., see Patent Literature 1).

The following Patent Literature 2 describes a glass fiber-reinforced resin molded article in which the fiber diameter D (µm) of glass fiber included in the glass fiber-reinforced resin molded article is in the range of 3.0 to 12.0 µm, the number average fiber length L (µm) of the glass fiber included in the glass fiber-reinforced resin molded article is in the range of 160 to 350 µm, the glass fiber volume content V (%) in the glass fiber-reinforced resin molded article is in the range of 3.0 to 50.0%, and the above D, L, and V satisfy the following formula (6).

$$300.0 \leq D^2 \times L/V \leq 1000.0 \tag{6}$$

CITATION LIST

Patent Literature

Patent Literature 1: Japanese Patent Laid-Open No. 2008-095066

Patent Literature 2: No. WO 2018/159861

SUMMARY OF INVENTION

Technical Problem

Use of glass fiber-reinforced resin molded articles as metal substitute materials in the automotive field has expanded recently. In the automotive field, glass fiber-reinforced resin molded articles are required to have high mechanical strength (e.g., tensile strength and bending strength) in order to achieve the safety of drivers and durability of parts.

Conventionally, in order to improve the mechanical strength of glass fiber-reinforced resin molded articles, increasing the length of glass fiber present in the glass fiber-reinforced resin molded articles has been contemplated. For example, in Patent Literature 1, the weight average fiber length of glass fiber present in a glass fiber-reinforced resin molded article is allowed to be 1 mm or more by using long fiber-reinforced resin pellets, obtained by impregnated glass fiber roving as continuous fiber with a resin melt.

In the case where long fiber-reinforced resin pellets are used, however, a state referred to as undispersion is likely to occur, in which state, a portion of glass fiber (glass fiber is usually formed by a plurality of glass filaments bundled) in the glass fiber-reinforced resin molded article are not dispersed into a state of glass filaments and remains in a state of glass strands (in a form of a plurality of glass filaments bundled). When undispersion occurs, intense unevenness may occur depending on sites in the glass fiber-reinforced resin molded article. Particularly, in large glass fiber-reinforced resin molded articles such as automotive exterior parts, intense unevenness leads to stress concentration and may degrade the safety and durability of the glass fiber-reinforced resin molded article.

The present invention has been made in view of the above situation, and an object thereof is to provide a glass fiber-reinforced resin molded article that has high mechanical strength and in which occurrence of undispersion of glass fiber is suppressed.

Solution to Problem

In order to achieve the object, in a glass fiber-reinforced resin molded article of the present invention, glass fiber included in the glass fiber-reinforced resin molded article comprises a flat cross-sectional shape having a minor axis D1 in the range of 3.0 µm or more and 10.5 µm or less and a major axis D2 in the range of 11.0 µm or more and 29.0 µm or less, the number average fiber length L (µm) of the glass fiber included in the glass fiber-reinforced resin molded article is in the range of 195 µm or more and less than 400 µm, the glass fiber content C (wt %) in the glass fiber-reinforced resin molded article is in the range of more than 50.0 wt % and 80.0 wt % or less, and the above D1, D2, L, and C satisfy the following formula (1).

$$1200.0 \leq C \times L^2/(D1 \times D2^2) \leq 2550.0 \tag{1}$$

According to the glass fiber-reinforced resin molded article of the present invention, the above D1, D2, L, and C being in the range described above and satisfying the condition of the above formula (1) allows the glass fiber-reinforced resin molded article to comprise high mechanical strength and suppresses occurrence of undispersion of the glass fiber. Here, comprising high mechanical strength means that the tensile strength of the glass fiber-reinforced resin molded article is more than 250 MPa and the bending strength thereof is more than 400 MPa.

In the glass fiber-reinforced resin molded article of the present invention, it is also preferable that the above D1 be in the range of 3.5 µm or more and 6.4 µm or less, the above D2 be in the range of 14.0 µm or more and 26.0 µm or less, the above L be in the range of 200 µm or more and 350 µm or less, the above C be in the range of 52.0 wt % or more and 75.0 wt % or less, and the above D1, D2, L, and C satisfy the following formula (2).

$$1700.0 \leq C \times L^2/(D1 \times D2^2) \leq 2300.0 \tag{2}$$

According to the glass fiber-reinforced resin molded article of the present invention, the above D1, D2, L, and C being in the range described above and satisfying the condition of the above formula (2) allows the glass fiber-reinforced resin molded article to comprise higher mechanical strength and suppresses occurrence of undispersion of the glass fiber. Here, comprising higher mechanical strength means that the tensile strength of the glass fiber-reinforced resin molded article is 260 MPa or more and the bending strength thereof is more than 400 MPa.

In the glass fiber-reinforced resin molded article of the present invention, it is also preferable that the above D1 be in the range of 4.0 μm or more and 6.0 μm or less, the above D2 be in the range of 16.0 μm or more and 24.0 μm or less, the above L be in the range of 205 μm or more and 300 μm or less, the above C be in the range of 53.0 wt % or more and 70.0 wt % or less, and the above D1, D2, L, and C satisfy the following formula (3).

$$1980.0 \leq C \times L^2/(D1 \times D2^2) \leq 2180.0 \qquad (3)$$

According to the glass fiber-reinforced resin molded article of the present invention, the above D1, D2, L, and C being in the range described above and satisfying the condition of the above formula (3) allows the glass fiber-reinforced resin molded article to comprise higher mechanical strength, suppresses occurrence of undispersion of the glass fiber, and further allows the article to comprise excellent fluidity.

In the glass fiber-reinforced resin molded article of the present invention, the resin included in the glass fiber-reinforced resin molded article is preferably a thermoplastic resin for injection molding selected from the group consisting of polyamide resins, polybutylene terephthalate resins, polycarbonate resins, polyarylene sulfide resins, polyaryl ketone resins, and liquid crystal polymer (LCP) and is more preferably a polyamide resin.

Use of the above thermoplastic resin for injection molding enables large glass fiber-reinforced resin molded articles to be produced efficiently. Particularly, polyamide resins, which have an excellent balance between strength and heat resistance, are suitable as metal substitute materials for automotive bodies and provide a large effect of improving production efficiency by use of the glass fiber-reinforced resin molded article of the present invention.

DESCRIPTION OF EMBODIMENTS

Hereinafter, embodiments of the present invention will be described in detail.

In a glass fiber-reinforced resin molded article of the present embodiment, glass fiber included in the glass fiber-reinforced resin molded article comprises a flat cross-sectional shape having a minor axis D1 in the range of 3.0 μm or more and 10.5 μm or less and a major axis D2 in the range of 11.0 μm or more and 29.0 μm or less, the number average fiber length L (μm) of the glass fiber included in the glass fiber-reinforced resin molded article is in the range of 195 μm or more and less than 400 μm, the glass fiber content C (wt %) in the glass fiber-reinforced resin molded article is in the range of more than 50.0 wt % and 80.0 wt % or less, and the above D1, D2, L, and C satisfy the following formula (1).

$$1200.0 \leq C \times L^2/(D1 \times D2^2) \leq 2550.0 \qquad (1)$$

According to the glass fiber-reinforced resin molded article of the present invention, the above D1, D2, L, and C being in the range described above allows the glass fiber-reinforced resin molded article to comprise high mechanical strength and suppresses occurrence of undispersion of the glass fiber. Here, comprising high mechanical strength means that the tensile strength of the glass fiber-reinforced resin molded article is more than 250 MPa and the bending strength thereof is more than 400 MPa.

In the present invention, the tensile strength and the bending strength each can be measured by the following methods. Apparatuses for use in measurement are not particularly limited as long as having performance equivalent to that of the apparatuses described below.

[Tensile Strength]

An A-type dumbbell test piece (thickness: 4 mm) in compliance with JIS K 7165:2008 is subjected to a static tensile test in compliance with JIS K 7165:2008 under a condition of test temperature of 23° C. using a precision universal tester (manufactured by Shimadzu Corporation, trade name: Autograph AG-5000B) to measure the tensile strength.

[Bending Strength]

The test piece is subjected to a static tensile test in compliance with JIS K 7171:2016 under a condition of test temperature of 23° C. using a precision universal tester (manufactured by Shimadzu Corporation, trade name: Autograph AG-5000B) to measure the bending strength.

In the glass fiber-reinforced resin molded article of the present embodiment, when the minor axis D1 of the glass fiber is less than 3.0 μm, it is feared that the health of producers may be adversely affected in the manufacturing process of glass fiber and glass fiber-reinforced resin molded articles. Meanwhile, in the glass fiber-reinforced resin molded article of the present embodiment, when the minor axis D1 of the glass fiber exceeds 10.5 μm, a glass fiber-reinforced resin molded article comprising high mechanical strength cannot be obtained.

In the glass fiber-reinforced resin molded article of the present embodiment, it is difficult to produce glass fiber having the major axis D2 of the glass fiber of less than 11.0 μm and comprising a flat cross-sectional shape. Meanwhile, in the glass fiber-reinforced resin molded article of the present embodiment, when the major axis D2 of the glass fiber exceeds 29.0 μm, a glass fiber-reinforced resin molded article comprising high mechanical strength cannot be obtained.

In the glass fiber-reinforced resin molded article of the present embodiment, the minor axis D1 of the glass fiber is preferably 3.5 μm or more and 6.4 μm or less, more preferably 4.0 μm or more and 6.0 μm or less, and further preferably 4.5 μm or more and 5.5 μm or less because the surface smoothness of the glass fiber-reinforced resin molded article increases. The major axis D2 of the glass fiber is preferably 14.0 μm or more and 26.0 μm or less, more preferably 16.0 μm or more and 24.0 μm or less, and further preferably 18.0 μm or more and 22.0 μm or less because the surface smoothness of the glass fiber-reinforced resin molded article increases.

The minor axis and major axis of the glass fiber in the glass fiber-reinforced resin molded article of the present embodiment can be calculated by, for example, first, polishing a cross section of a glass fiber-reinforced resin molded article, then, measuring the length of the major axis and the minor axis of 100 or more glass filaments using an electron microscope, the major axis being the longest side that passes through the substantial center of the glass filament cross section, the minor axis being the side that orthogonally intersects the major axis at the substantial center of the glass filament cross section, and determining the average values thereof.

The glass fiber is usually formed by a plurality of glass filaments bundled, but in the glass fiber-reinforced resin molded article, which is subjected to molding processing, the glass filaments are debundled and present dispersed in a glass filament state in the glass fiber-reinforced resin molded article.

In the glass fiber-reinforced resin molded article of the present embodiment, the ratio of the major axis D2 to the minor axis D1 of the glass fiber (D2/D1) is, for example, in the range of 1.2 or more and 10.0 or less, preferably in the range of 1.8 or more and 8.0 or less, more preferably in the range of 2.0 or more and 6.0 or less, further preferably in the range of 2.5 or more and 5.5 or less, particularly preferably in the range of 3.0 or more and 5.0 or less, and most preferably in the range of 3.3 or more and 4.5 or less.

In the glass fiber-reinforced resin molded article of the present embodiment, examples of the flat cross-sectional shape possessed by the glass fiber included in the glass fiber-reinforced resin molded article include a long-oval shape (a shape obtained by replacing each shorter side of a rectangle by a semicircle having a diameter corresponding to the shorter side), an oval, and a rectangle. A long-oval shape is preferable because of its contribution to enhancement in the fluidity of the glass fiber-reinforced resin molded article. The cross section of the glass fiber herein means a transverse cross section perpendicular to the fiber length direction of the glass fiber.

In the glass fiber-reinforced resin molded article of the present embodiment, the number average fiber length L of the glass fiber may be in the range of 1 μm or more and 10000 μm or less. When the number average fiber length L of the glass fiber is less than 195 μm, a glass fiber-reinforced resin molded article comprising sufficient mechanical strength is more unlikely to be obtained. In contrast, when the number average fiber length L of the glass fiber is 400 μm or more, undispersion of the glass fiber may occur in the glass fiber-reinforced resin molded article.

In the glass fiber-reinforced resin molded article of the present embodiment, the number average fiber length L of the glass fiber is preferably 200 μm or more and 350 μm or less, more preferably 205 μm or more and 300 μm or less, further preferably 210 μm or more and 290 μm or less, particularly preferably 215 μm or more and 285 μm or less, especially preferably 220 μm or more and 280 μm or less, extremely preferably 225 μm or more and 275 μm or less, and most preferably 230 μm or more and 270 μm or less.

The number average fiber length of the glass fiber in the glass fiber-reinforced resin molded article of the present embodiment can be calculated by the following method. First, the glass fiber-reinforced resin molded article is heated in a muffle furnace at 650° C. for 0.5 to 24 hours to decompose organic matter. Then, the remaining glass fiber is transferred to a glass petri dish, and the glass fiber is dispersed using acetone on the surface of the petri dish. Subsequently, the fiber length of 1000 or more glass fiber filaments dispersed on the petri dish surface is measured using a stereoscopic microscope and averaged to calculate the number average fiber length of the glass fiber.

When the glass fiber content C is 50.0 wt % or less in the glass fiber-reinforced resin molded article of the present embodiment, a glass fiber-reinforced resin molded article comprising high mechanical strength cannot be obtained. In contrast, when the glass fiber content C is more than 80.0 wt % in the glass fiber-reinforced resin molded article of the present invention, undispersion of glass fiber may occur in the glass fiber-reinforced resin molded article.

In the glass fiber-reinforced resin molded article of the present embodiment, the glass fiber content C is preferably 52.0 wt % or more and 75.0 wt % or less, more preferably 53.0 wt % or more and 70.0 wt % or less, and further preferably 55.0 wt % or more and 65.0 wt % or less.

The glass fiber content in the glass fiber-reinforced resin molded article of the present embodiment can be calculated in compliance with JIS K 7052:1999.

When the minor axis D1 (μm) of the glass fiber, the major axis D2 (μm) of the glass fiber, the fiber length L (μm) of the glass fiber, and the glass fiber content C (wt %) do not satisfy the formula (1), in other words, when $C \times L^2/(D1 \times D2^2)$ is less than 1200 or more than 2550, a glass fiber-reinforced resin molded article comprising high mechanical strength cannot be obtained, or undispersion of the glass fiber may occur in the glass fiber-reinforced resin molded article.

In the glass fiber-reinforced resin molded article of the present embodiment, the above D1, D2, L, and C preferably satisfy the following formula (4).

$$1600.0 \leq C \times L^2/(D1 \times D2^2) \leq 2350.0 \tag{4}$$

In the glass fiber-reinforced resin molded article of the present embodiment, the above D1, D2, L, and C more preferably satisfy the following formula (2). When $C \times L^2/(D1 \times D2^2)$ satisfies the following formula (2), the glass fiber-reinforced resin molded article comprises higher mechanical strength, and occurrence of undispersion of the glass fiber is suppressed.

$$1700.0 \leq C \times L^2/(D1 \times D2^2) \leq 2300.0 \tag{2}$$

In the glass fiber-reinforced resin molded article of the present embodiment, the above D1, D2, L, and C further preferably satisfy the following formula (5).

$$1850.0 \leq C \times L^2/(D1 \times D2^2) \leq 2250.0 \tag{5}$$

In the glass fiber-reinforced resin molded article of the present embodiment, the above D1, D2, L, and C particularly preferably satisfy the following formula (3). When $C \times L^2/(D1 \times D2^2)$ satisfies the following formula (3), the glass fiber-reinforced resin molded article comprises higher mechanical strength, and occurrence of undispersion of the glass fiber is suppressed.

$$1980.0 \leq C \times L^2/(D1 \times D2^2) \leq 2180.0 \tag{3}$$

In the glass fiber-reinforced resin molded article of the present embodiment, the glass composition of glass forming the glass fiber is not particularly limited. In the glass fiber-reinforced resin molded article of the present embodiment, examples of the glass composition that may be taken by the glass fiber can include the most common E glass composition (composition including $SiO_2$ in the range of 52.0 to 56.0 wt %, $Al_2O_3$ in the range of 12.0 to 16.0 wt %, MgO and CaO in the range of 20.0 to 25.0 wt % in total, and $B_2O_3$ in the range of 5.0 to 10.0 wt %, converted in terms of oxide, with respect to the total amount of the glass fiber), a high strength and high modulus glass composition (composition including $SiO_2$ in the range of 64.0 to 66.0 wt %, $Al_2O_3$ in the range of 24.0 to 26.0 wt %, and MgO in the range of 9.0 to 11.0 wt %, with respect to the total amount of the glass fiber), a high modulus and easily-producible glass composition (composition including $SiO_2$ in the range of 57.0 to 60.0 wt %, $Al_2O_3$ in the range of 17.5 to 20.0 wt %, MgO in the range of 8.5 to 12.0 wt %, CaO in the range of 10.0 to 13.0 wt %, $B_2O_3$ in the range of 0.5 to 1.5 wt %, and $SiO_2$, $Al_2O_3$, MgO, and CaO of 98.0 wt % or more in total, with respect to the total amount of the glass fiber), and a low dielectric constant and low dielectric tangent glass composition (composition including $SiO_2$ in the range of 48.0 to 62.0 wt %, $B_2O_3$ in the range of 17.0 to 26.0 wt %, $Al_2O_3$ in the range of 9.0 to 18.0 wt %, CaO in the range of 0.1 to 9.0 wt %, MgO in the range of 0 to 6.0 wt %, $Na_2O \cdot K_2O \cdot Li_2O$ in the range of 0.05 to 0.5 wt % in total, $TiO_2$ in the range of 0 to 5.0 wt %, SrO in the range of 0 to 6.0 wt %, $F_2 \cdot Cl_2$ in the range of 0 to 3.0 wt % in total, and $P_2O_5$ in the range of 0 to 6.0 wt % with respect to the total amount of the glass fiber). From the viewpoint of enhancing the mechanical strength of the glass fiber-reinforced resin molded article, the glass composition of the glass fiber is preferably the high strength and high modulus glass composition or the high modulus and easily-producible glass composition.

Regarding measurement of the content of each component described above in the glass fiber included in the glass fiber-reinforced resin molded article of the present embodiment, the content of Li as the light element can be measured with an ICP emission spectroscopic analyzer, and the contents of the other elements can be measured with a wavelength dispersive X-ray fluorescence analyzer.

The measurement method is as follows. First, a glass batch (prepared by mixing glass raw material) or glass fiber (when organic matter adheres to the surface of the glass fiber, or when glass fiber is mainly included as a reinforcing material in organic matter (resin), the glass fiber is used after the organic matter is removed by, for example, heating for about 2 to 24 hours in a muffle furnace at 300 to 600° C.) is placed in a platinum crucible and melted with stirring while being held at a temperature of 1550° C. for 6 hours in an electric furnace to obtain a homogeneous molten glass. Next, the obtained molten glass is poured onto a carbon plate to produce a glass cullet, and then pulverized into powder. Regarding Li as a light element, glass powder is thermally decomposed with an acid and then quantitatively analyzed using an ICP emission spectroscopic analyzer. Regarding other elements, glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above content (% by mass) of each component can be determined from these numerical values.

The glass fiber comprising the above glass composition is produced as follows. First, a glass raw material (glass batch) prepared to have the above composition, based on the content of components included in ores to be the glass raw material and each component and the amount of each component volatilized in the melting process, is supplied to a melting furnace and melted at a temperature in the range of 1450 to 1550° C., for example. Then, the melted glass batch (melted glass) is drawn from 1 to 20000 nozzle tips of a bushing controlled at a predetermined temperature and rapidly cooled to form glass filaments. Subsequently, the glass filaments formed are applied with a sizing agent or binder using an applicator as an application apparatus. While 1 to 20000 of the glass filaments are bundled using a bundling shoe, the glass filaments are wound on a tube at a high speed using a winding apparatus to obtain glass fiber. Allowing the nozzle tip to have a non-circular shape and to have a protrusion or a notch for rapidly cooling the molten glass and controlling the temperature condition can provide glass filaments having a flat cross-sectional shape. Adjusting the diameter of the nozzle tip, winding speed, temperature conditions, and the like can adjust the minor axis D1 (μm) and major axis D2 (μm) of the glass fiber. For example, accelerating the winding speed can make the minor axis D1 and major axis D2 smaller, and reducing the winding speed can make the minor axis D1 and major axis D2 larger.

In the glass fiber-reinforced resin molded article of the present embodiment, the glass fiber may be coated with an organic matter on the surface thereof for the purposes such as improvement of adhesiveness between glass fiber and a resin, and improvement of uniform dispersibility of glass fiber in a mixture of glass fiber and a resin or inorganic material. Examples of such an organic matter can include urethane resins, epoxy resins, vinyl acetate resins, acrylic resins, modified polypropylene (particularly carboxylic acid-modified polypropylene), and a copolymer of (poly) carboxylic acid (particularly maleic acid) and an unsaturated monomer.

In the glass fiber-reinforced resin molded article of the present embodiment, the glass fiber may be coated with the resin composition including a silane coupling agent, a lubricant, a surfactant, and the like in addition to these resins. Such a resin composition covers the glass fiber at a rate of 0.1 to 2.0 wt % based on the mass of the glass fiber in a state where it is not coated with the resin composition. The glass fiber can be coated with an organic matter by applying the sizing agent or the binder containing the resin solution or the resin composition solution to the glass fiber using a known method such as a roller applicator, for example, in the manufacturing process of the glass fiber and then drying the glass fiber to which the resin solution or the resin composition solution is applied.

Examples of the silane coupling agent include aminosilanes (such as γ-aminopropyltriethoxysilane, N-β-(aminoethyl)-γ-aminopropyltrimethoxysilane, N-β-(aminoethyl)-N'-(β-(aminoethyl)-γ-aminopropyltrimethoxysilane, and γ-anilinopropyltrimethoxysilane), chlorosilanes (such as γ-glycidoxypropyltrimethoxysilane), epoxysilanes (such as β-(3,4-epoxycyclohexyl)ethyltrimethoxysilane), mercaptosilanes (such as γ-mercaptotrimethoxysilane as γ-chloropropyltrimethoxysilane), vinylsilanes (such as vinyltrimethoxysilane and N-(β-(N-vinylbenzylaminoethyl)-γ-aminopropyltrimethoxysilane), acrylsilanes (such as γ-methacryloxypropyltrimethoxysilane), and cationic silanes (such as N-(vinylbenzyl)-2-aminoethyl-3-aminopropyltrimethoxysilane hydrochloride and N-phenyl-3-aminopropyltrimethoxysilane hydrochloride). As the silane coupling agent, these compounds can be used singly or in combination of two or more.

Examples of the lubricant include modified silicone oil, animal oils (such as beef tallow) and hydrogenated product thereof, vegetable oils (such as soybean oil, coconut oil, rapeseed oil, palm oil, and castor oil) and hydrogenated products thereof, animal waxes (such as beeswax and lanolin), vegetable waxes (such as candelilla wax and carnauba wax), mineral waxes (such as paraffin wax and montan wax), condensates of a higher saturated fatty acid and a higher saturated alcohol (such as stearates such as lauryl stearate), polyethyleneimine, polyalkylpolyamine alkylamide derivatives, fatty acid amides (e.g., dehydrated condensates of polyethylenepolyamines such as diethylenetriamine, triethylenetetramine, and tetraethylenepentamine and fatty acids such as lauric acid, myristic acid, palmitic acid, and stearic acid), and quaternary ammonium salts (such as alkyltrimethylammonium salts such as lauryltrimethylammonium chloride). As the lubricant, these can be used singly or in combinations of two or more.

Examples of the surfactant include nonionic surfactants, cationic surfactants, anionic surfactants, and amphoteric surfactants. As the surfactant, these compounds can be used singly or in combination of two or more.

Examples of the nonionic surfactant include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant include alkyldimethylbenzylammonium chloride, alkyltrimethylammonium chloride, alkyl dimethyl ethyl ammonium ethyl sulfate, higher alkylamine salts (such as acetate and hydrochloride), adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant include amino acid amphoteric surfactants such as alkali metal salts of alkylaminopropionic acid, betaine amphoteric surfactants such as alkyldimethylbetaine, and imidazoline amphoteric surfactants.

The glass fiber-reinforced resin molded article of the present embodiment includes, in addition to the above glass fiber, a thermoplastic resin or a thermosetting resin, and additives other than glass fiber. In the glass fiber-reinforced resin molded article of the present embodiment, the content of the thermoplastic resin or the thermosetting resin is 20.0 wt % or more and less than 50.0 wt %, for example. In the glass fiber-reinforced resin molded article of the present embodiment, the content of the additives other than the glass fiber is 0 to 25.0 wt %, for example.

Examples of the above thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PIT), polycarbonate, polyarylene sulfide, polyethersulfone (PES), polyphenylsulfone (PPSU), polyphenylene ether (PPE), modified polyphenylene ether (m-PPE), polyaryl ketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Specific examples of the polyethylene include high density polyethylene (HDPE), medium density polyethylene, low density polyethylene (LDPE), linear low density polyethylene (LLDPE), and ultra-high molecular weight polyethylene.

Examples of the polypropylene include isotactic polypropylene, atactic polypropylene, syndiotactic polypropylene, and mixtures thereof.

Examples of the polystyrene include general-purpose polystyrene (GPPS), which is an atactic polystyrene having an atactic structure, high impact polystyrene (HIPS) with a rubber component added to GPPS, and syndiotactic polystyrene having a syndiotactic structure.

Examples of the methacrylic resin include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (Nylon 1012), polyundecanamide (Nylon 11), polyundecamethylene adipamide (Nylon 116), polydodecanamide (Nylon 12), polyxylene adipamide (nylon XD6), polyxylene sebacamide (nylon XD10), polymetaxylylene adipamide (nylon MXD6), polyparaxylylene adipamide (nylon PXD6), polytetramethylene terephthalamide (nylon 4T), polypentamethylene terephthalamide (nylon 5T), polyhexamethylene terephthalamide (nylon 6T), polyhexamethylene isophthalamide (nylon 6I), polynonamethylene terephthalamide (nylon 9T), polydecamethylene terephthalamide (nylon 10T), polyundecamethylene terephthalamide (nylon 11T), polydodecamethylene terephthalamide (nylon 12T), polytetramethylene isophthalamide (nylon 4I), polybis(3-methyl-4-aminohexyl) methane terephthalamide (nylon PACMT), polybis(3-methyl-4-aminohexyl) methane isophthalamide (nylon PACMI), polybis(3-methyl-4-aminohexyl) methane dodecamide (nylon PACM12), and polybis(3-methyl-4-aminohexyl) methane tetradecamide (nylon PACM14), or copolymers obtained by combining two or more of the components, and mixtures thereof.

Examples of the polyacetal include a homopolymer with oxymethylene units as the main repeating unit, and a copolymer mainly composed of oxymethylene units and containing oxyalkylene units having 2 to 8 adjacent carbon atoms in the main chain.

Examples of the polyethylene terephthalate include polymers obtained by polycondensation of terephthalic acid or a derivative thereof with ethylene glycol.

Examples of the polybutylene terephthalate include polymers obtained by polycondensation of terephthalic acid or a derivative thereof with 1,4-butanediol.

Examples of the polytrimethylene terephthalate include polymers obtained by polycondensation of terephthalic acid or a derivative thereof with 1,3-propanediol.

Examples of the polycarbonate include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide include linear polyphenylene sulfide, crosslinked polyphenylene sulfide having a high molecular weight obtained by performing a curing reaction after polymerization, polyphenylene sulfide sulfone, polyphenylene sulfide ether, and polyphenylene sulfide ketone.

Examples of the modified polyphenylene ether include: a polymer alloy of poly(2,6-dimethyl-1,4-phenylene)ether and polystyrene; a polymer alloy of poly(2,6-dimethyl-1,4-phenylene)ether and a styrene/butadiene copolymer; a polymer alloy of poly(2,6-dimethyl-1,4-phenylene)ether and a styrene/maleic anhydride copolymer; a polymer alloy of poly(2,6-dimethyl-1,4-phenylene)ether and polyamide; and a polymer alloy of poly(2,6-dimethyl-1,4-phenylene)ether and styrene/butadiene/acrylonitrile copolymer.

Examples of the polyaryl ketone include polyetherketone (PEK), polyetheretherketone (PEEK), polyetherketoneketone (PEKK), and polyetheretherketoneketone (PEE·BR>JK).

Examples of the liquid crystal polymer (LCP) include a polymer (copolymer) composed of one or more structural units selected from aromatic hydroxycarbonyl units which are thermotropic liquid crystal polyesters, aromatic dihydroxy units, aromatic dicarbonyl units, aliphatic dihydroxy units, and aliphatic dicarbonyl units.

Examples of the fluororesin include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin include copolymers of an olefin or a styrene and an unsaturated carboxylic acid, wherein a part of carboxyl groups is neutralized with a metal ion.

Examples of the olefin/vinyl alcohol resin include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin include monocyclic compounds such as cyclohexene, polycyclic compounds such as tetracyclopentadiene, and polymers of cyclic olefin monomers.

Examples of the polylactic acid include poly-L-lactic acid, which is a homopolymer of L-form, poly-D-lactic acid, which is a homopolymer of D-form, or a stereocomplex polylactic acid which is a mixture thereof.

Examples of the cellulose resin can include methylcellulose, ethylcellulose, hydroxycellulose, hydroxymethylcellulose, hydroxyethylcellulose, hydroxyethyl methylcellulose, hydroxypropyl methylcellulose, cellulose acetate, cellulose propionate, and cellulose butyrate.

Examples of the above thermosetting resin can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicon (SI) resins, furan (FR) resins, benzoguanamine (BR) resins, alkyd resins, xylene resins, bismaleide triazine (BT) resins, and diallyl phthalate resin (PDAP).

Specific examples of the unsaturated polyester include resins obtained by esterification reaction of aliphatic unsaturated dicarboxylic acid and aliphatic diol.

Examples of the vinyl ester resin include bis vinyl ester resins and novolac vinyl ester resins.

Examples of the epoxy resin include bisphenol A epoxy resins, bisphenol F epoxy resins, bisphenol E epoxy resins, bisphenol S epoxy resins, bisphenol M epoxy resins (4,4'-(1,3-phenylenediisopropylidene)bisphenol epoxy resins), bisphenol P epoxy resins (4,4'-(1,4-phenylenediisopropylidene)bisphenol epoxy resins), bisphenol Z epoxy resins (4,4'-cyclohexadiene bisphenol epoxy resins), phenol novolac epoxy resins, cresol novolac epoxy resins, tetraphenol group ethane novolac epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbornene epoxy resins, adamantane epoxy resins, and fluorene epoxy resins. Examples of the melamine resin include a polymer formed by polycondensation of melamine (2,4,6-triamino-1,3,5-triazine) and formaldehyde. Examples of the phenolic resin include novolac phenolic resins such as phenol novolac resins, cresol novolac resins, and bisphenol A novolac resins, resol phenol resins such as methylol resole resins and dimethylene ether resole resins, or aryl alkylene phenol resins, and include one of these or combinations of two or more.

Examples of the urea resin include a resin obtained by condensation of urea and formaldehyde.

The above thermoplastic resin or the above thermosetting resin may be used singly or in combinations of two or more.

Since efficient production of a large glass fiber-reinforced resin molded article is enabled, the resin used in the glass fiber-reinforced resin molded article of the present embodiment is preferably a thermoplastic resin, more preferably a thermoplastic resin for injection molding, further preferably a resin selected from the group consisting of polyamide resins, polybutylene terephthalate resins, polycarbonate resins, polyarylene sulfide resins, polyaryl ketone resins, and liquid crystal polymer (LCP), and particularly preferably an polyamide resin.

Examples of the above additives other than the glass fiber can include reinforcing fiber other than glass fiber (e.g., carbon fiber and metal fiber), a filler other than glass fiber (e.g., glass powder, talc, and mica), a flame retardant, an UV absorber, a heat stabilizer, an antioxidant, an antistatic agent, a fluidity improver, an anti-blocking agent, a lubricant, a nucleating agent, an antibacterial agent, and pigment.

The glass fiber-reinforced resin molded article of the present embodiment can be obtained by molding a mixture composed of the above glass fiber, the above thermoplastic resin or thermosetting resin, and the above additives other than the glass fiber by a molding method appropriately selected, in accordance with the properties of the resin and additives and the application of the glass fiber-reinforced resin molded article, from known molding methods such as injection molding method, injection compression molding method, two-color molding method, hollow molding method, foam molding method (including supercritical fluid foam molding method), insert molding method, in-mold coating molding method, extrusion molding method, sheet molding method, thermal molding method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method.

The glass fiber-reinforced resin molded article of the present embodiment is preferably a glass fiber-reinforced resin injection molded article obtained by an injection molding method. The injection molding method, which includes a more excellent molding cycle than that of other molding methods, is suitable for efficient production of large glass fiber-reinforced resin molded articles.

In particular, an injection molding method using thermoplastic resin pellets including glass fiber is preferably employed. In this case, as glass fiber to be included in the thermoplastic resin pellets, preferably employed are chopped strands obtained by cutting glass fiber having the number of glass filaments constituting the glass fiber (number bundled) (also referred to as a glass fiber bundle or glass strand) of preferably 1 to 20000, more preferably 50 to 10000, and further preferably 1000 to 8000 into a length of preferably 1.0 to 30.0 mm, more preferably 2.0 to 15.0 mm, and further preferably 2.3 to 7.8 mm. Examples of the form of the glass fiber include rovings, in which the number of glass filaments constituting the glass fiber is 10 to 30000 and which are obtained without cutting, and cut fiber, in which the number of glass filaments constituting the glass fiber is 1 to 20000 and which is obtained by pulverization so as to have a length of 0.001 to 0.900 mm by a known method such as a ball mill or Henschel mixer, in addition to chopped strands.

A method for producing the thermoplastic resin pellets is not particularly limited. For example, the pellets can be produced by melt-kneading chopped strands and a thermoplastic resin as described above under known kneading conditions corresponding to the thermoplastic resin used using a twin-screw kneader or the like and extrusion-molding the kneaded product. Then, a glass fiber-reinforced resin molded article can be obtained by conducting injection molding using these thermoplastic resin pellets under known injection molding conditions corresponding to the thermoplastic resin used with an injection molding machine.

The number average fiber length L (μm) of the glass fiber included in the glass fiber-reinforced resin molded article can be adjusted by the length of the chopped strands to be included in the thermoplastic resin pellets, the kneading condition in the period from pellet formation to injection molding, and the injection molding conditions. For example, the number average fiber length L (μm) of the glass fiber included in the glass fiber-reinforced resin molded article can be made longer by lowering the screw rotation speed during twin-screw kneading and can be made shorter by elevating the screw rotation speed during twin-screw kneading, within the range of 10 to 1000 rpm, in the manufacturing process of the thermoplastic resin pellets.

Examples of applications of the glass fiber-reinforced resin molded article of the present embodiment include, but are not limited to, metal substitute materials for automobiles. The glass fiber-reinforced resin molded article of the present embodiment can be used in, for example, vehicle exterior members (such as bumper, fender, bonnet, air dam, and wheel cover), vehicle interior members (such as door trim, ceiling materials, and combination switch), vehicle engine members (such as cylinder head cover, oil pan, engine cover, intake manifold, intake air duct, air pipe, cooling fan, chain guide, tensioner, orifice for engine mount, impeller, air flow meter, ignition coil cover, actuator case, quick connector, and exhaust manifold), vehicle electrical components, vehicle mechanism components (pedal module, shift lever base, pulley, seal ring, gear, bearing), vehicle muffler components (such as silencers), electronic device housing, other electronic components (connectors, sockets, LEDs, and sealed molded articles), high-pressure tank, and the like.

Examples and Comparative Examples of the present invention will be shown.

EXAMPLES

Examples 1 to 3 and Comparative Examples 1 to 3

First, glass chopped strands of the E glass composition of which the minor axis and major axis of glass fiber, the cross-sectional shape, cut length (usually approximately 1 to 5 mm), and amount compounded of glass fiber were adjusted (the weight of the glass fiber in the glass fiber-reinforced resin molded article is determined by the composition, minor axis, major axis, cross-sectional shape, and number bundled of the glass fiber and the cut length and number of the glass fiber) such that the glass fiber, the cross-sectional shape of the glass fiber, and the number average fiber length of the glass fiber, and glass fiber content in a glass fiber-reinforced resin molded article corresponded to those of Examples 1 to 2 and Comparative Examples 1 to 3 shown in Table 1 and a polyamide resin PA6 (manufactured by Ube Industries, Ltd., trade name: UBE Nylon 1015B) were kneaded in a twin-screw kneader (manufactured by Toshiba Machine Co., Ltd., trade name: IBM-26SS) with the screw rotation speed adjusted to thereby produce resin pellets. Then, the resin pellets obtained were used to conduct injection molding in an injection molding apparatus (manufactured by Nissei Plastic Industrial Co. Ltd., trade name: NEX80) to thereby produce A-type dumbbell test pieces (thickness: 4 mm) in compliance with JIS K 7165:2008. The test pieces were used as test pieces for tensile strength and bending strength measurement.

Comparative Examples 4 to 6

Glass rovings of the E glass composition of which the minor axis and the major axis of the glass fiber, the cross-sectional shape, and amount compounded of the glass fiber were adjusted such that the cross-sectional shape of the glass fiber, the number average fiber length of the glass fiber, and the glass fiber content in the glass fiber-reinforced resin molded article corresponded to those of Comparative Examples 4 to 6 shown in Table 1, and a polyamide resin PA6 (manufactured by Ube Industries, Ltd., trade name: UBE Nylon 1010X) were pelletized in an LFT production apparatus (manufactured by Kobe Steel, Ltd.) to thereby produce resin pellets. Then, the resin pellets obtained were used to conduct injection molding in an injection molding apparatus (manufactured by Nissei Plastic Industrial Co. Ltd., trade name: NEX80) to thereby produce A-type dumbbell test pieces (thickness: 4 mm) in compliance with JIS K 7165:2008. The test pieces were used as test pieces for tensile strength and bending strength measurement.

As for the test pieces obtained, the number average fiber length of the glass fiber included in the molded article and the tensile strength and the bending strength of the molded article were each measured in accordance with the above methods. Also, presence or absence of undispersion was evaluated by the following method. Further, for Examples 1 to 3, the fluidity was evaluated by the following method.

In Table 1, in Comparative Examples 2 to 4, the cross-sectional shape of the glass fiber is a circular shape, and thus, it is not possible to distinguish between the minor axis and the major axis. For convenience, the fiber length is entered as the minor axis D1 and the major axis D2, and $C \times L^2/(D1 \times D2^2)$ is calculated.

[Presence or Absence of Undispersion]

Soft X-ray images of the A-type dumbbell test pieces described above were taken with a soft X-ray imaging apparatus (TYPE M-60 manufactured by SDI-TEX Co., Ltd.). Case where it was possible to observe bulk glass fiber not dispersed to a state of glass filaments and remaining in a state of glass strands on the image were evaluated as "present", and the other cases were evaluated as "absent".

[Fluidity]

Glass fiber-containing resin pellets prepared for obtaining a glass fiber-reinforced resin molded article were injected with a compact electric injection molding machine (SE18-DUZ manufactured by Sumitomo Heavy Industries, Ltd.) into a mold having a spiral width of 5 mm and a spiral thickness of 3 mm under a condition of a speed of 50 mm/s, and the spiral length when the pressure was 150 MPa was measured. The case where the spiral length was 30 mm or more was evaluated as "A", and the case where the length was less than 30 mm was evaluated as "B".

MPa and bending strength of more than 400 MPa, and occurrence of undispersion of the glass fiber is suppressed.

$$1200.0 \leq C \times L^2/(D1 \times D2^2) \leq 2550.0 \tag{1}$$

In contrast, in the glass fiber-reinforced resin molded articles of Comparative Examples 1 to 6, the glass fibers included in the glass fiber-reinforced resin molded articles does not satisfy the requirement described above, and it thus can be said that high mechanical strength has not achieved or undispersion of the glass fiber has occurred.

The invention claimed is:

1. A glass fiber-reinforced resin molded article, wherein glass fiber included in the glass fiber-reinforced resin molded article comprises a flat cross-sectional shape having a minor axis D1 in a range of 3.0 μm or more and 6.4 μm or less and a major axis D2 in a range of 11.0 μm or more and 26.0 μm or less, a number average fiber length L (μm) of the glass fiber included in the glass fiber-reinforced resin molded article is in a range of 195 μm or more and less than 275 μm, a glass fiber content C (wt %) in the glass fiber-reinforced resin molded article is in a range of 65.0 wt % or more and 70.0 wt % or less, and the D1, D2, L, and C satisfy following formula (1), with liquid crystal polymer being excluded from resin included in the glass fiber-reinforced resin molded article, the resin content in the glass fiber-reinforce resin molded article is in a range of 30.0 mass % or more, and the content of additive other than the glass fiber is in the range of 0 to 5 wt %:

$$1851.5 \leq C \times L^2/(D1 \times D2^2) \leq 2106.8 \tag{1}.$$

2. The glass fiber-reinforced resin molded article according to claim 1, wherein the D1 is in a range of 4.0 μm or

TABLE 1

| | Example | | | Comparative Example | | | | | |
|---|---|---|---|---|---|---|---|---|---|
| | 1 | 2 | 3 | 1 | 2 | 3 | 4 | 5 | 6 |
| Minor axis D1 (μm) | 5.0 | 5.0 | 7.0 | 5.0 | 6.5 | 11.0 | 17.0 | 9.0 | 5.0 |
| Major axis D2 (μm) | 20.0 | 20.0 | 28.0 | 20.0 | 6.5 | 11.0 | 17.0 | 36.0 | 20.0 |
| Cross-sectional shape | Long-oval | Long-oval | Long-oval | Long-oval | Circle | Circle | Circle | Long-oval | Long-oval |
| Number average fiber length L (μm) | 265 | 230 | 320 | 190 | 160 | 244 | 650 | 740 | 710 |
| Glass fiber content C (wt %) | 60.0 | 70.0 | 70.0 | 60.0 | 60.0 | 60.0 | 60.0 | 60.0 | 60.0 |
| $C \times L^2/(D1 \times D2^2)$ | 2106.8 | 1851.5 | 1306.1 | 1083.0 | 5593.1 | 2683.8 | 5159.8 | 2816.9 | 15123.0 |
| Tensile strength (MPa) | 262 | 280 | 255 | 258 | 220 | 217 | 250 | 275 | 300 |
| Bending strength (MPa) | 403 | 441 | 419 | 385 | 375 | 371 | 475 | 499 | 520 |
| Undispersion | Absent | Absent | Absent | Absent | Absent | Absent | Present | Present | Present |
| Fluidity | A | B | B | — | — | — | — | — | — |

As shown in Table 1, the glass fiber included in the glass fiber-reinforced resin molded articles represented in Examples 1 to 3 comprises a flat cross-sectional shape having a minor axis D1 in the range of 3.0 μm or more and 10.5 μm or less and a major axis D2 in the range of 11.0 μm or more and 29.0 μm or less, the number average fiber length L (μm) of the glass fiber included in the glass fiber-reinforced resin molded article is in the range of 195 μm or more and less than 400 μm, the glass fiber content C (wt %) in the glass fiber-reinforced resin molded article is in the range of more than 50.0 wt % and 80.0 wt % or less, and the above D1, D2, L, and C satisfy the following formula (1). It can be said that the glass fiber-reinforced resin molded articles represented in the above Examples 1 to 3 comprise high mechanical strength: tensile strength of more than 250 more and 6.0 μm or less, the D2 is in a range of 16.0 μm or more and 24.0 μm or less, the L is in a range of 205 μm or more and less than 275 μm, and the D1, D2, L, and C satisfy following formula (3):

$$1980.0 \leq C \times L^2/(D1 \times D2^2) \leq 2106.8 \tag{3}.$$

3. The glass fiber-reinforced resin molded article according to claim 1, wherein a resin included in the glass fiber-reinforced resin molded article is a thermoplastic resin for injection molding selected from a group consisting of polyamide resins, polybutylene terephthalate resins, polycarbonate resins, polyarylene sulfide resins, and polyaryl ketone resins.

4. The glass fiber-reinforced resin molded article according to claim 3, wherein the resin included in the glass fiber-reinforced resin molded article is polyamide resin.

5. A vehicle exterior member comprising the glass fiber-reinforced resin molded article according to claim 1.

6. A vehicle interior member comprising the glass fiber-reinforced resin molded article according to claim 1.

7. A vehicle engine member comprising the glass fiber-reinforced resin molded article according to claim 1.

8. A vehicle mechanism component comprising the glass fiber-reinforced resin molded article according to claim 1.

9. A vehicle muffler component comprising the glass fiber-reinforced resin molded article according to claim 1.

10. An electronic device housing comprising the glass fiber-reinforced resin molded article according to claim 1.

* * * * *